(No Model.)
C. M. BARTLETT.
WHEEL PIT AND MECHANISM FOR THE ADMISSION OF WATER THERETO.
No. 398,309. Patented Feb. 19, 1889.
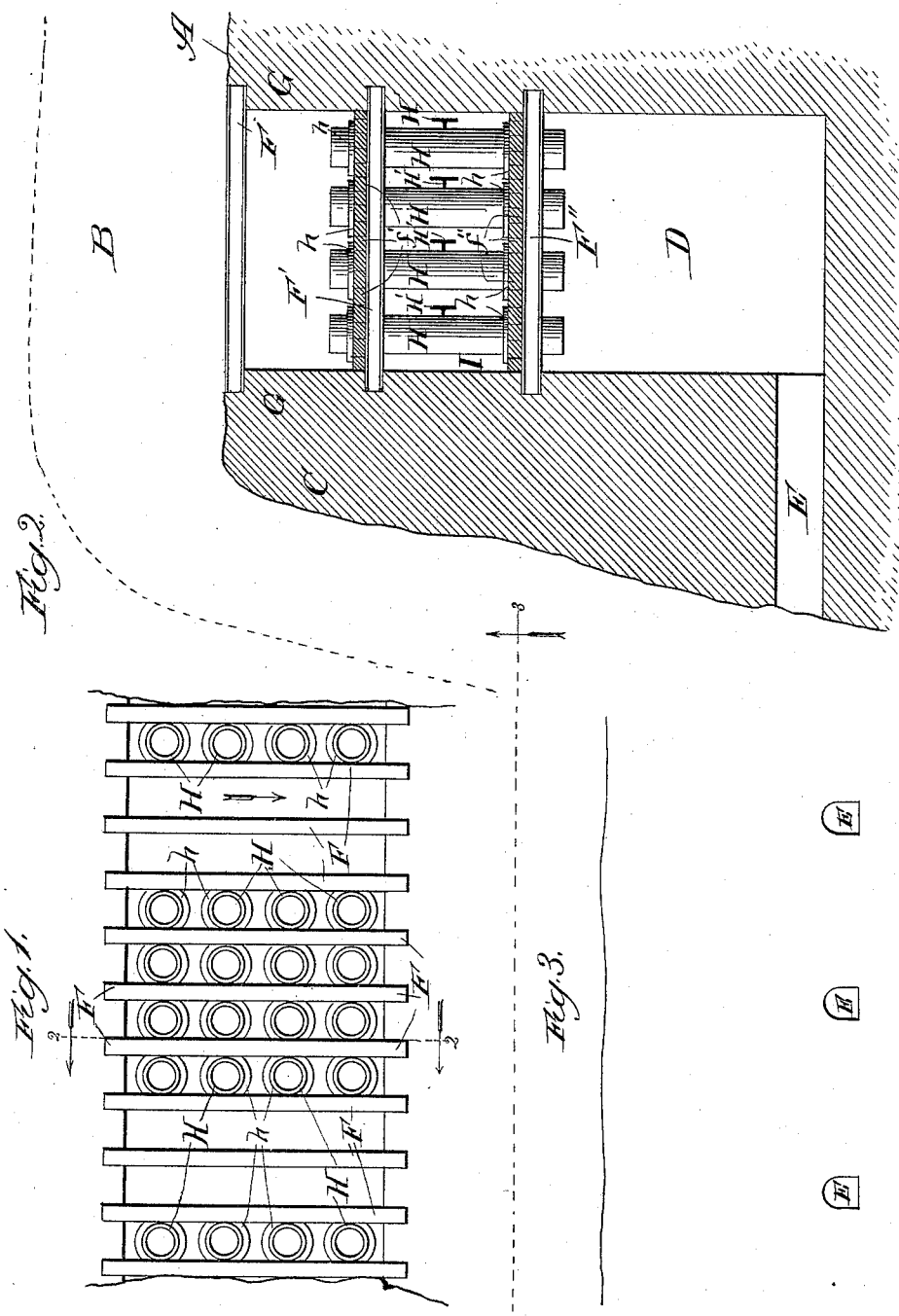

UNITED STATES PATENT OFFICE.

CHARLES M. BARTLETT, OF CHICAGO, ILLINOIS.

WHEEL-PIT AND MECHANISM FOR THE ADMISSION OF WATER THERETO.

SPECIFICATION forming part of Letters Patent No. 398,309, dated February 19, 1889.

Application filed November 26, 1888. Serial No. 291,879. (No model.)

*To all whom it may concern:*

Be it known that I, CHARLES M. BARTLETT, a citizen of the United States, residing at Chicago, in the county of Cook and State of Illinois, have invented certain new and useful Improvements in Wheel-Pits and Mechanism for the Admission of Water Thereto, of which the following is a full and complete description, sufficient to enable those skilled in the art to understand and construct the same.

My invention relates to wheel-pits in which may be placed water-wheels or motors, whether overshot, breast-wheels, turbine wheels, or the like, and into which wheel-pit water may be admitted from a river, lake, or pond, and from which wheel-pit such water may be discharged after having passed from contact with the water wheel or motor placed therein; and the object of my invention is to secure a wheel-pit into which water may be admitted as desired, directly from a river or other body of water, without the intervention of a sluiceway or canal.

A further object of my invention is to secure a wheel-pit so located and constructed that the water wheel, motor, or other machinery placed therein will, to a great extent, be unaffected by the changes in temperature during different seasons of the year, or by the varying temperature of any day in the year, and also to secure a wheel-pit from which ice, drift-wood, and other obstructing articles or things may be readily excluded.

A further object of my invention is to so construct the wheel-pit and the machinery by which water is admitted thereto that those in charge thereof may have complete and perfect control of the amount and quantity of water entering said wheel-pit.

I am aware that wheel-pits have been located at varying distances from the river or canal from which the supply of water actuating the wheels or motors placed therein has been obtained, and that such water has been conducted to said wheel-pits in open sluiceways and in covered tunnels, and that the said wheel-pits, or at least that portion of said wheel-pits in which the motor actuated by the water passing through such wheel-pits is placed, have been constructed and placed at a lower level than the surface of the body of water in said river, canal, lake, or pond; but so far as I am aware no one has heretofore constructed a wheel-pit located or placed in the position wherein said wheel-pit is placed by me, or in such place that a sluiceway, race, or canal may be dispensed with; and my invention consists in constructing a wheel-pit having suitable means for the discharge of all water contained therein underneath the bed of the body of water used in actuating the wheels or motors placed therein, and in the constructions whereby water is admitted to said wheel-pit from said body of water or excluded therefrom, and drift-wood and other foreign material—as ice—prevented from entering therein, and also whereby admission is obtained to the valves or gates by which the volume of water entering said wheel-pit is controlled.

My invention is specially adapted for use in places wherein the bed of the river, lake, or pond is composed of natural rock, and in such case girders, hereinafter fully described, are placed in steps cut in said natural-rock bed at or near to the bottom of said river, lake, or pond.

I have illustrated my invention by the drawings accompanying and forming a part hereof, in which—

Figure 1 is a plan view of a portion of a body of water—as a river—underneath which my invention has been placed.

In the placing of my invention underneath the bed of a river, lake, or pond it is advisable that the same be placed near or adjacent to falls therein, or in the case of a lake or pond adjacent to the dam or other obstruction causing said lake or pond, and in Fig. 1 the direction of the current of the water flowing over said falls or dam is indicated by the arrow thereon.

Fig. 2 is a cross-section of my invention on line 2 2 of Fig. 1. Fig. 3 is a front face view on line 3 3 of Fig. 1.

Like letters refer to like parts throughout the several views.

A is the bed of the river or lake.

B is water.

C is the fall or dam over which the water in said river, lake, or pond flows to escape therefrom.

D is the wheel-pit.

E are the outlets from said wheel-pit.

F F are girders, constructed of iron or other suitable material, and placed at or near the bed of the river, lake, or pond. Girders F F are placed at suitable distances apart and in the line of the current of the water passing or flowing over them.

F' F' is a second series of like girders as are girders F F, and are secured in position parallel with girders F F and a suitable distance below the same—as, say, from five to ten feet—and on said girders F' is placed water-tight deck or flooring $f'$. There is thus formed between girders F F and F' F' a pool of water of a depth equal to the distance apart of the said flooring $f'$ and girders F F.

F'' are girders also placed parallel with girders F and any desired distance below said girders F' F'. On girders F'' F'' is placed a water-tight deck or flooring, $f''$.

H H are vertical metal tubes or cylinders extending from above water-tight deck or flooring $f'$ through the same and to and through the water-tight deck or flooring $f''$ and a short distance below the same.

H' are valves or gates in vertical cylinders H. By the opening and closing of said valves or gates H' the volume of water passing through said cylinders from above downward and into said wheel-pit is regulated and controlled.

$h\ h\ h$ are flanges, which may be placed on said vertical cylinder H, and by which said cylinder may be supported on decks or floorings $f'\ f''$.

I is the chamber between decks or floorings $f'\ f''$, and is formed by said decks or floorings. In case a number of wheel-pits are constructed, forming a "gang," so called, the chamber I is divided into sections, if desired, or it may be left in one large vault or chamber over all of the wheel-pits forming said gang.

Where my invention is placed under the bed of a river having a fall therein, and wherein the said bed consists of natural rock, I prefer to construct my invention as follows: Tunnel E, serving as the outlet for the water passing into and through wheel-pit D, is first constructed in the ordinary manner of rock-tunneling, and wheel-pit D is then excavated or blasted upward from said tunnel E a sufficient height to permit the placing therein of girders F' F'' and the flooring or water-tight deck $f'$ and $f''$, with the vertical cylinders H placed in position between said floorings and through the same, as described. After the construction of said deck or flooring $f'\ f''$, with the vertical pipes or cylinders H H properly secured therein, the rock or other material above said water-tight deck or flooring $f'$ and above the upper end of said vertical pipes or cylinders H H may be excavated or taken from its previous position from above in the ordinary manner of removing rock from the bed of a river or other body of water, as by the placing of a coffer-dam in position around the same. The object of girders F F and the placing of the same above water-tight deck or flooring $f'$ in the manner described, and forming the pool hereinbefore referred to, is to secure a body of comparatively-quiet water directly above vertical pipes or cylinders H H, into which pool-ice, floating trees, and other drift-wood cannot pass, the said girders F F serving as rests or supports, upon which any of said or other like obstacles may rest a sufficient distance above the upper end of said vertical cylinders to be free from the current or suction caused by the water passing through said vertical cylinders, and over which said girders said obstructions may pass without being stopped or otherwise affected by said current or suction. It is evident that any material—as ice or drift-wood—passing down the said river or over the outlet of said lake or pond will be pressed forward over said girders F F by the water passing from said river, lake, or pond, and may readily pass over said falls or dam in the ordinary manner.

Where it is desired to use a larger portion of the water passing over the falls or dams from any river, lake, pond, or canal than can be utilized in one wheel-pit and by the water wheels or motors placed therein, a series of wheel-pits may be placed underneath the bed thereof extending across, or nearly so, the entire width of said falls or dam; and if still further use of such water may be desired a second series of such wheel-pits may be placed back of the series hereinbefore described.

Where a breast-wheel or an "overshot wheel," so called, or other like wheels are used in the wheel-pit hereinbefore described, the second flooring (lettered $f''$) may not necessarily be water-tight, and is not in all cases so constructed.

Having thus described my invention and its construction, what I claim, and desire to secure by Letters Patent, is—

1. The combination, in a wheel-pit placed underneath the bed of a river, lake, or pond, of a water-tight deck or flooring underneath a series of girders located at or near the level of the bottom of the said river, lake, or pond, whereby a pool is formed above said water-tight deck or flooring, a second deck or flooring placed underneath such water-tight deck or flooring, and vertical pipes or cylinders extending through and above said water-tight deck or flooring and through and below said second flooring and into the wheel-pit below the same, substantially as described.

2. The combination, in a wheel-pit placed underneath the bed of a river, lake, or pond, of a water-tight deck or flooring underneath a series of girders located at or near the level of the bottom of said river, lake, or pond, whereby a pool is formed above said water-tight deck or flooring and below said girders, a second deck or flooring placed underneath such water-tight deck or flooring, and vertical pipes extending through and above said water-tight deck or flooring and through and below said second flooring and into the wheel-pit below the same, and valves or gates in said vertical pipes or cylinders, by which the admission of water through said vertical pipes or cylinders may be controlled, substantially as described.

CHARLES M. BARTLETT.

Witnesses:
 THEODORE NELSON,
 CHARLES T. BROWN.